April 12, 1966          W. E. BELL          3,246,158
OPTICAL DETECTORS
Filed Feb. 10, 1961
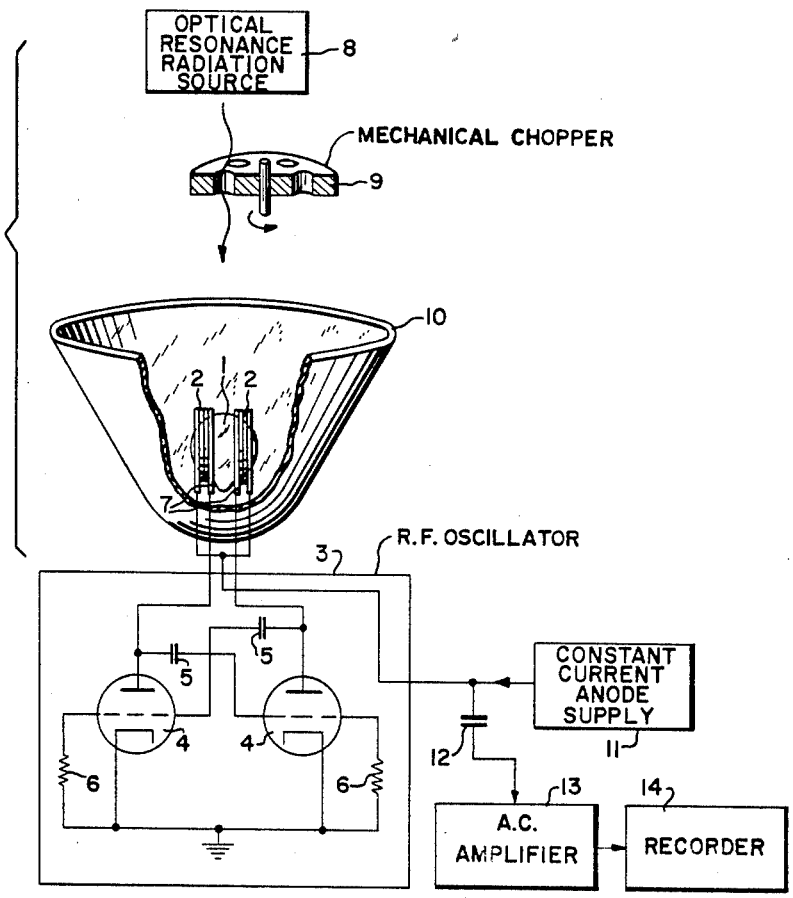
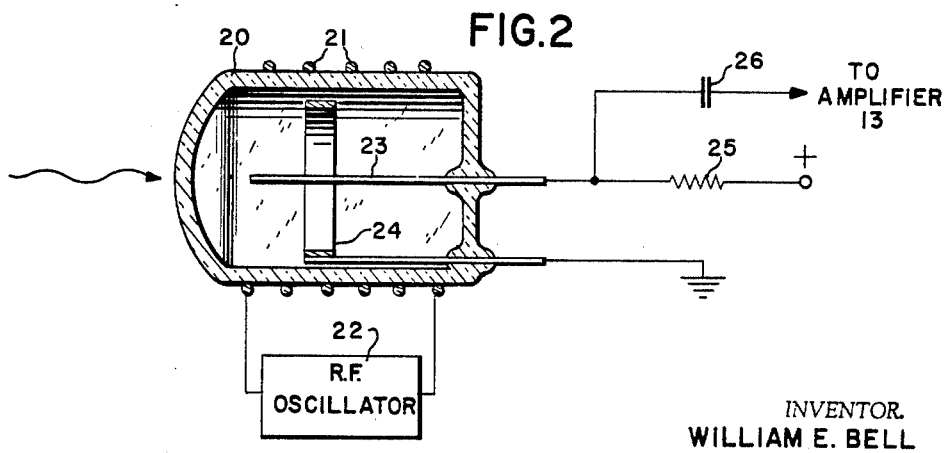
INVENTOR.
WILLIAM E. BELL
BY
ATTORNEY

3,246,158
OPTICAL DETECTORS
William E. Bell, Palo Alto, Calif., assignor to Varian Associates, Palo Alto, Calif., a corporation of California
Filed Feb. 10, 1961, Ser. No. 88,362
13 Claims. (250—199)

The present invention relates in general to narrow-band optical detection, and more particularly to novel discharge photocells characterized by high sensitivity and selectivity.

In such applications as optical communication, gas analysis, process monitoring, and optical detection of magnetic resonance, electrical signals are obtained from optical resonance radiation of certain specific wavelengths. In order to improve the sensitivity and efficiency of detection, it is desirable to employ photodetectors which are sensitive only to the optical frequencies of interest. Heretofore, such narrow band optical detection has usually been achieved with delicate interference-type laboratory equipment which is too inefficient and cumbersome for practical instrumentation.

It is the principal object of the present invention to provide a photocell which is intrinsically sensitive only to specific wavelengths of optical radiation thereby serving as a simple and effective narrow band photodetector.

One feature of the present invention is the provision of an optically sensitive element comprising a gas or vapor plasma maintained in a soft glow discharge condition by electrodeless radio frequency excitation.

Another feature of the present invention is the provision of a radio frequency oscillator, the tank coil of which is closely coupled to an optically sensistive discharge whereby the conductivity of the discharge is monitored by the loading of said tank coil.

Still another feature of the present invention is the provision of a concentric cylindrical electrode configuration for monitoring the conductivity of an optically sensitive discharge.

These and other features and advantages of the present invention will become more apparent upon a perusal of the following specification taken in connection with the accompanying drawings wherein, FIG. 1 is a diagram of an optical detection system in accordance with the present invention employing an electrodeless glow discharge photocell, and FIG. 2 is a diagram of an alternative photocell utilizing concentric cylindrical electrodes for the collection and measurement of discharge current.

In accordance with the present invention it has been discovered that the conductivity of a soft or barely self-sustaining glow discharge is extremely sensitive to the irradiation of certain optical lines of the same gas or vapor as that used in discharge, but is not affected by the irradiation spectrum of other substances and is relatively insensitive to background irradiation from white light sources. For example, in neon, argon, krypton and xenon the effect is found to be due to the series of lines lying within a range between 6,000 and 9,000 angstroms; in helium, almost entirely to the 20,581 angstrom line (making it particularly useful in many applications); and in mercury, primarily to the 5,461 angstrom line. Since in all observed cases the sensitive lines are those which raise an atom from a metastable state to a non-metastable state from which it can decay with high probability to the ground state, it is postulated that the ionization in such a discharge takes place through the collision of metastable atoms (or molecules) whereby the sensitive radiation reduces the discharge conductivity by depopulating the metastable levels.

In addition to the above examples, there exists other substances which are characterized by spectral transitions from a metastable level, and in the case of molecular transitions, in particular, the optical wavelengths of interest may extend into the sub-millimeter range.

In the photocell of FIG. 1, the optically sensitive gas or vapor is contained at low pressure in a spherical glass bulb 1 captured in spring-like engagement by the split winding excitation coil 2 of radio frequency oscillator 3 which provides just sufficient power to initiate a self-sustaining or glow discharge.

For a bulb 1 of about 1 cm.$^3$ volume, the minimum excitation frequency is about 60 mc. However, higher frequencies are found to yield greater line selectivity, less intensity fluctuation noise, and a slower rate of cleanup when a metallic vapor is used, apparently due to the shorter mean free path per cycle of the charged particles in the discharge. Oscillator 3 embodies a very simple, efficient and low-noise circuit for obtaining a suitable excitation and also for monitoring the conductivity of the discharge. The excitation coil 2 functions as a self-resonant tank coil fed in push-pull by sub-miniature triode amplifier tubes 4 which are cross-coupled through grid-plate feedback capacitors 5 to maintain oscillations at about 100 megacycles, the grid leak resistors 6 establishing a negative grid bias for class C operation.

It will be noted that the two halves of the excitation coil 2 are wound in an inside-out relation; that is, the two end turns 7 are placed adjacent to each other. When the discharge is initiated a strong electric field will be established between these end turns to aid in the striking of the discharge, the discharge being thereafter maintained in a relatively noise-free soft glow condition by the R.F. magnetic field of the coil 2 which uniformly threads the bulb 1 in close-coupled relation. Further, this split coil arrangement minimizes the blockage of incident optical radiation.

In operation, an optical resonance radiation source 8 (for example, a discharge signaling lamp, or a leak detecting tracer gas which has been excited to fluorescence in a vacuum system) emits a light beam of frequencies corresponding to the sensitive absorption lines of the gas or vapor in the bulb 1. This light beam is modulated by a mechanical chopper 9, and focused by a parabolic reflector 10 on the bulb 1, thereby effecting periodic decreases in the discharge conductivity at the light modulation frequency and hence corresponding changes in the loading of the oscillator tank coil 2 which is closely coupled thereto. Since the anode circuit of the oscillator 3 is energized by a high internal impedance, constant current supply 11, these changes in loading are reflected with a high degree of sensitivity and stability as corresponding changes in plate voltage which are coupled through D.C. blocking capacitor 12 and A.C. amplifier 13 to a recorder or other suitable read-out device 14 which indicates the amplitude of the modulation frequency signal as a measure of the incident light intensity. This response is found to be linear over three orders of magnitude variation in light intensity.

In FIG. 2, an alternative discharge photocell is shown wherein changes in the discharge conductivity are monitored directly by the ionization current. A soft glow discharge in a substantially cylindrical glass chamber 20 is maintained by a concentric coil 21 which is energized through radio frequency oscillator 22. Within the chamber 20 are positioned a high voltage cylindrical rod electrode 23 and a grounded concentric cylindrical ring electrode 24. In operation, light-sensitive changes in the conductivity of the discharge produce corresponding changes in the discharge current between electrodes 23 and 24 and hence in the voltage across series resistor 25. This modulation frequency signal is coupled through D.C. blocking capacitor 26 to provide an indication of the incident light intensity as described with reference to FIG. 1.

It has also been observed that a light-sensitive glow discharge may be obtained in a chamber such as that shown in FIG. 2 by applying a suitable high voltage bias between the electrodes 23 and 24, in which case the radio frequency oscillator and coil can be omitted and the outer cylindrical electrode 24 elongated and made a part of the vacuum envelope of the discharge tube. However, an electrodeless radio frequency discharge is more uniform and noise-free, and so is advantageously capable of greater sensitivity and selectivity. Also, it should be noted that parallel planar electrodes may be used instead of the concentric electrodes 23 and 24, but in this case the response time would be slower due to the more non-uniform rate of charged particle collection, and in the event that an encircling R.F. coil is used, a greater portion of the incident light would be blocked from the discharge chamber.

In the system of FIG. 1, the mechanical light chopper 9 was provided to increase the sensitivity of detection by the use of a tuned A.C. amplifier 13. It will be understood that other known light modulating elements may be used for this purpose. If the light intensity from the source 8 is variable in amplitude as, for example, where audio frequency information is fed to the energizing electrodes of a signaling lamp, the light modulator may be omitted.

Since many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

What is claimed is:

1. A narrow-band optical detection system comprising: means for containing an optically sensitive plasma, an electrodeless radio frequency means for applying a radio frequency signal inductively and externally disposed relative to said containing means for maintaining said plasma in a glow discharge condition, and means for monitoring the conductivity of said discharge as an indication of the intensity of optical radiation incident thereon.

2. An optical detection system according to claim 1 wherein said radio frequency means includes a radio frequency coil encircling said containing means.

3. An optical detection system according to claim 2 wherein said coil is closely-coupled to said discharge and said conductivity monitoring means includes means responsive to the loading of said coil.

4. An optical detection system according to claim 2 wherein said monitoring means includes: a pair of electrodes positioned within said containing means, and means responsive to the ionization current between said electrodes.

5. A narrow-band optical detection system comprising a bulb for containing an optically sensitive plasma, a radio frequency oscillator including a self-resonant tank coil, such coil encircling said bulb in close-coupled relation, and means for monitoring the loading of said tank coil as an indication of the intensity of optical radiation incident on said bulb.

6. An optical detection system according to claim 5 wherein said oscillator is energized by a constant current supply, and said means for monitoring the coil loading includes means responsive to the voltage developed by said supply.

7. An optical detection system according to claim 5 wherein said oscillator includes a pair of triode amplifier tubes, cross-coupled through grid-plate capacitors, and energizing said coil in push-pull.

8. An optical detection system according to claim 7 wherein said coil is wound so that the end turns thereof are adjacent each other to provide a strong electric field for initiating a discharge in said bulb.

9. A narrow band optical detection system comprising means for containing an optically sensitive plasma, said containing means including concentric cylindrical electrodes, a radio frequency coil externally coupled to said containing means and wound substantially concentrically with relation to said concentric electrodes, and means responsive to ionization current between said electrodes as an indication of optical radiation incident on said plasma.

10. In an optical detection system, the combination comprising: a source of helium optical resonance radiation; a detector including electrodeless means for containing a plasma of metastable helium atoms, means inductively coupled to said containing means and external thereof for exciting and maintaining said plasma in a glow discharge condition by radio frequency excitation, and means for monitoring the conductivity of said plasma as an indication of the intensity of helium optical resonance radiation incident thereof.

11. In an optical detection system, the combination comprising: a source of optical resonance radiation; and a detector of said radiation including electrodeless means for containing a plasma of the same substance as that yielding said radiation, radio frequency means for maintaining said plasma in a glow discharge condition, and means for monitoring the conductivity of said discharge as an indication of the intensity of radiation incident thereon.

12. The combination of claim 11 wherein said substance is selected from the group consisting of helium, neon, argon, krypton, xenon and mercury.

13. The combination of claim 11 wherein the intensity of said source is varied, and said conductivity monitoring means includes an alternating current amplifier responsive to the frequency range of said intensity variations.

References Cited by the Examiner

UNITED STATES PATENTS

| | | | |
|---|---|---|---|
| 1,596,759 | 8/1926 | Mutscheller | 315—150 |
| 1,658,672 | 2/1928 | Davis | 250—211 X |
| 1,958,066 | 5/1934 | Penning | 250—211 |
| 1,961,708 | 6/1934 | Penning et al. | 315—150 |
| 2,025,912 | 12/1935 | Swart | 250—199 |
| 2,051,537 | 8/1936 | Wolff et al. | 250—7 |
| 2,123,242 | 7/1938 | Hollmann | 315—150 |
| 2,395,850 | 3/1946 | Colman | 325—67 |
| 2,562,887 | 8/1951 | Beese | 250—211 |
| 2,836,722 | 5/1958 | Dicke et al. | 250—211 X |
| 2,858,421 | 10/1958 | Touvet | 250—7 |
| 2,951,183 | 8/1960 | Manfredi | 315—158 |
| 3,109,960 | 11/1963 | Bell et al. | |

DAVID G. REDINBAUGH, *Primary Examiner.*

WALTER STOLWEIN, CHESTER L. JUSTUS,
*Examiners.*